United States Patent
Pearce (10) Patent No.: US 6,189,489 B1
(45) Date of Patent: Feb. 20, 2001

(54) ANIMAL FEEDING BOWL

(76) Inventor: Woodrow W. Pearce, 1601 Puebla Dr., Glendale, CA (US) 91207

(*) Notice: Under 35 U.S.C. 154(b), the term of this patent shall be extended for 0 days.

(21) Appl. No.: 09/189,749

(22) Filed: Nov. 9, 1998

Related U.S. Application Data (63) Continuation-in-part of application No. 08/862,851, filed on May 23, 1997, now Pat. No. 5,832,872.

(51) Int. Cl.⁷ ..................................................... A01K 5/01
(52) U.S. Cl. ......................... 119/477; 119/51.5; 119/454; 248/222.14
(58) Field of Search .................................. 119/51.5, 72.5, 119/454, 456, 464, 469, 475, 477; 248/222.13, 222.14, 223.41

(56) References Cited

U.S. PATENT DOCUMENTS

| | | | |
|---|---|---|---|
| D. 340,554 | 10/1993 | Wheeler | D30/129 |
| D. 353,233 | 12/1994 | Robles | D30/130 |
| D. 353,518 | 12/1994 | Cautereels et al. | D7/560 |
| 1,708,838 | * 4/1929 | Hedrick | 119/61 |
| 1,718,432 | 6/1929 | Qualmann | |
| 1,879,332 | 9/1932 | Kulp | |
| 1,909,244 | 5/1933 | Ahlman | |
| 2,972,979 | * 2/1961 | Struck | 119/51.5 |
| 4,148,155 | 4/1979 | Allen | 47/59 |
| 4,257,353 | 3/1981 | Imhoff | 119/61 |
| 4,541,363 | 9/1985 | Paoluccio | 119/77 |
| 4,697,775 | 10/1987 | Wille | 248/231.4 |
| 4,709,658 | 12/1987 | Hostetler | 119/18 |
| 4,762,086 | 8/1988 | Atchley | 119/18 |
| 5,072,903 | 12/1991 | Griffin | 248/72 |
| 5,226,625 | * 7/1993 | Hanna | 248/222.1 |
| 5,228,411 | 7/1993 | O'Rourke | 119/26 |
| 5,284,173 | 2/1994 | Graves et al. | 137/1 |
| 5,421,289 | 6/1995 | Capellaro | 119/18 |
| 5,447,118 | * 9/1995 | Huff et al. | 119/475 X |
| 5,467,733 | 11/1995 | Messina | 119/18 |
| 5,676,091 | 10/1997 | Pennington et al. | 119/477 |

FOREIGN PATENT DOCUMENTS

| 658570 | 11/1986 | (CH) . |
| 2113519 | 8/1983 | (GB) . |

OTHER PUBLICATIONS

"Jungle Ware Locking Feed System" brochure, 1997, 1p., Jungle Talk International, Lafayette, Colorado.

* cited by examiner

Primary Examiner—Robert P. Swiatek
(74) Attorney, Agent, or Firm—Christie, Parker & Hale, LLP

(57) ABSTRACT

A self attaching, rugged animal feeding bowl for use in cages, kennels, compounds, and/or animal transportation containers. The bowl is constructed of a rigid hard surfaced polymer. The material used is molded with a heavy wall thickness which greatly reduces the possibility that an animal will be able to penetrate the surface with teeth, claws, bills or beaks thus reducing the risk of destruction of the bowl and harm to the animal. The bowl has an attachment apparatus including a slot for receiving a wire of an animal enclosure. The attachment member includes a male/female coupling which sandwiches the wires of the enclosure between the male/female members when the coupling is engaged. Ribs including a center rib support and reinforce the attachment apparatus as it is secured to the bowl. The attachment apparatus may be formed in two sections that interlockingly engage each other. A guard may be incorporated for preventing the spillover of food from the enclosure to the surrounding area. The bowl may have multiple compartments having barriers for preventing the spillover of food from one compartment to the other or to the surrounding area.

27 Claims, 10 Drawing Sheets

ANIMAL FEEDING BOWL

REFERENCE TO RELATED APPLICATION

The present application is related to a design patent application, application Ser. No. 29/056,629, filed Jul. 3, 1996 entitled Animal Feeding Bowl. The present application is a continuation in part application of U.S. application Ser. No. 08/862,851 filed on May 23, 1997 and now U.S. Pat. No. 5,832,872.

BACKGROUND OF THE INVENTION

The present invention relates to an animal feeding/watering bowl and to a self attaching mounting apparatus for securing the bowl to the wires of an enclosure housing an animal or bird.

Feeding bowls are standard equipment for bird cages and other animal enclosures and are constructed of numerous materials and in a wide variety of configurations. In recent years, plastic has become very popular as the material of choice for feeding bowls bird cages and other animal cages because it is an easily moldable material that can be designed to provide a rugged construction with tailored surfaces for enabling the animals to comfortably perch on the rim or elsewhere.

A problem with conventional feeding bowls is the issue of satisfactorily attaching the bowl to the interior of the enclosure, e.g., a cage. Currently, feeding bowls utilize a number of different designs and mechanisms for attaching bowls to the side of a cage. Such mechanisms are usually designed so as to engage two or more of the vertical wires of the cage. These attachments comprise a number of individual components for attaching the bowl to the cage. These multiple components add to the inconvenience and clumsiness of the mounting and securing the bowl in position as well as to the dismounting of the bowl for cleaning and filling with food. Thus, while plastic bowls are extremely popular for use as animal feeding receptacles, they have significant draw-backs in their utilization.

Another problem with bowls that attach to a cage is spillover of the food from the bowl to the surrounding floor during feeding. Consequently, cleaning of the surrounding floor is required.

It is common to use of multiple bowls or a bowls with multiple compartments for feeding animals or birds. For example, one bowl (or compartment) may be used for food while the other may be used for water. If separate bowls are used, these bowls are typically placed next to each other. During feeding, the food or water from one bowl is often spilled into the food or water in the other bowl. As result, the contents of each bowl or bowl section are contaminated.

It is highly desirable to provide an animal feeding bowl that can be easily mounted and dismounted from a cage using a minimum number of parts. The animal feeding bowl in the present invention satisfies these requirements.

It is also highly desirable to provide an accessory for preventing the spill over of food from the bowl to the surrounding floor. The present invention includes such an accessory.

Moreover, it is highly desirable to provide a bowl system consisting of at least two bowl compartments that would prevent the spill over of food from one bowl compartment to the other during feeding. The present invention also provides such a bowl system.

SUMMARY OF THE INVENTION

The present invention provides a rigid, self attaching feeding bowl for animals in a caged or restricted environment. The bowl is easily attached to the cage via a two section attachment device. The first section is connected or is integral to the bowl. The second section includes a male threaded member having a slot through the center thereof. The two sections interlockingly engage each other.

The second section is placed in the interior of the cage with the male member facing toward the exterior of the cage. The male member can either be inserted through the space between two adjacent bars or wires of a cage or is inserted with the slot straddling a single wire such that the threaded portion extends exteriorly of the cage. When inserted between two wires the second section is caused to seat or bear against the two adjacent cage wires. The male member and the second section to which it is attached is secured in place by utilizing a female member that is screw threaded onto the threaded male member and tightened so as to secure at least a wire against the with a flange formed on the female member facing the male member. Once the second section is attached to the cage, the first section extending from the bowl is slid into the second section, interlockingly engaging the second section.

A guard may also be incorporated for preventing the spillover of food from the bowl to the surrounding area. The guard is preferably a transparent planar surface. A hole is formed preferably at the center of the guard. The guard is preferably sandwiched between the cage and female member with the male member penetrating the hole.

Moreover, a bowl having multiple feeding compartments may be used. Such a bowl has a front wall which is shorter than rear wall and a partition or partitions for dividing the bowl into multiple compartments. The bowl has side walls having the same height as the front wall. The partitions have the same height as the rear wall. As such, each compartment has three walls that are taller than the front wall over which an animal or bird would feed. The taller three walls provide a barrier to the spillover of food from one compartment to another.

BRIEF DESCRIPTION OF THE DRAWINGS

These and other aspects of the invention will be further illustrated by reference to the drawings wherein.

DETAILED DESCRIPTION

Figure 1:
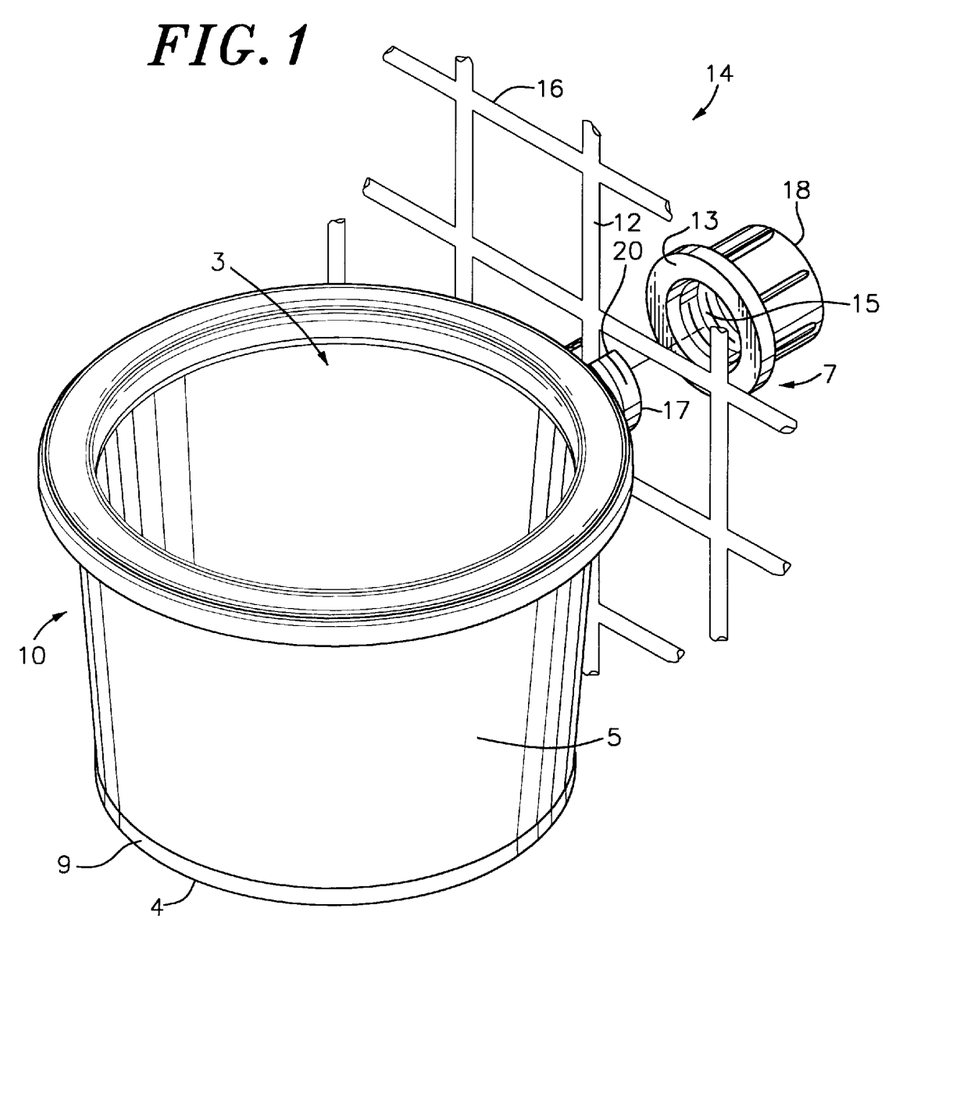
FIG. 1 is an exploded perspective view of the animal feeding bowl with attachment mechanism according to the present invention as it is about to be attached to a wire lattice used in a cage or animal enclosure with a slot in a male mounting member for receiving a vertical wire of the cage and a female member about to be attached to the male member.

Referring now to FIG. 1 as shown therein, an animal feeding bowl 10 according to the present invention is attached to a vertical element 12 of a cage 14. The cage as shown in FIG. 1 consists of vertical elements or wires 12 and horizontal elements or wires 16. Bowl 10 has an open top 3, a closed bottom for 4 and is round in configuration having a cylindrical side wall 5. "Bowl" as used herein, refers to all types of feeding dishes and is not limited to "bowl" shaped dishes. In one embodiment, an indented ring 9 is molded into the base of bowl 10 to facilitate stacking one bowl into another for shipping purposes and the like.

Figure 2:
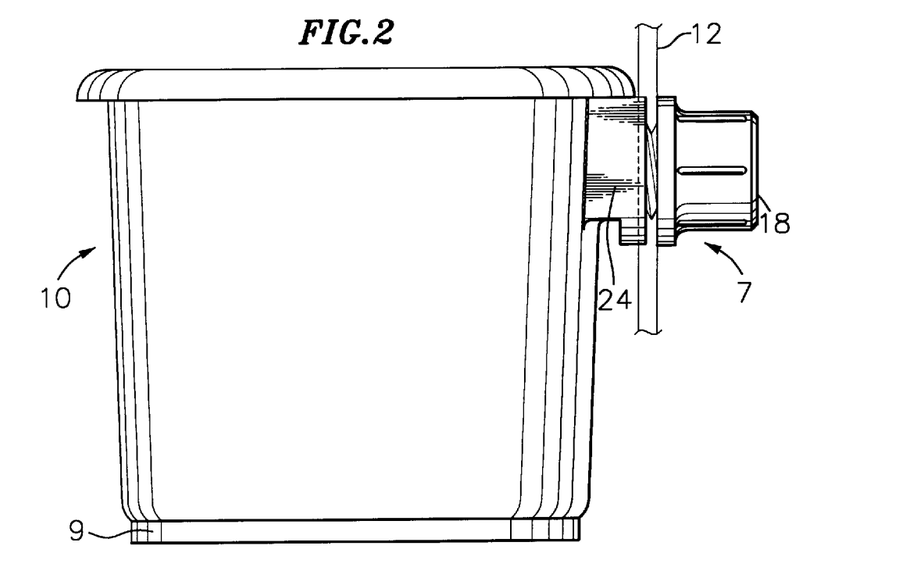
FIG. 2 is a side elevation view of the bowl according to the present invention showing the vertical wire in the slot and the bowl firmly secured to the wire.
Figure 3:
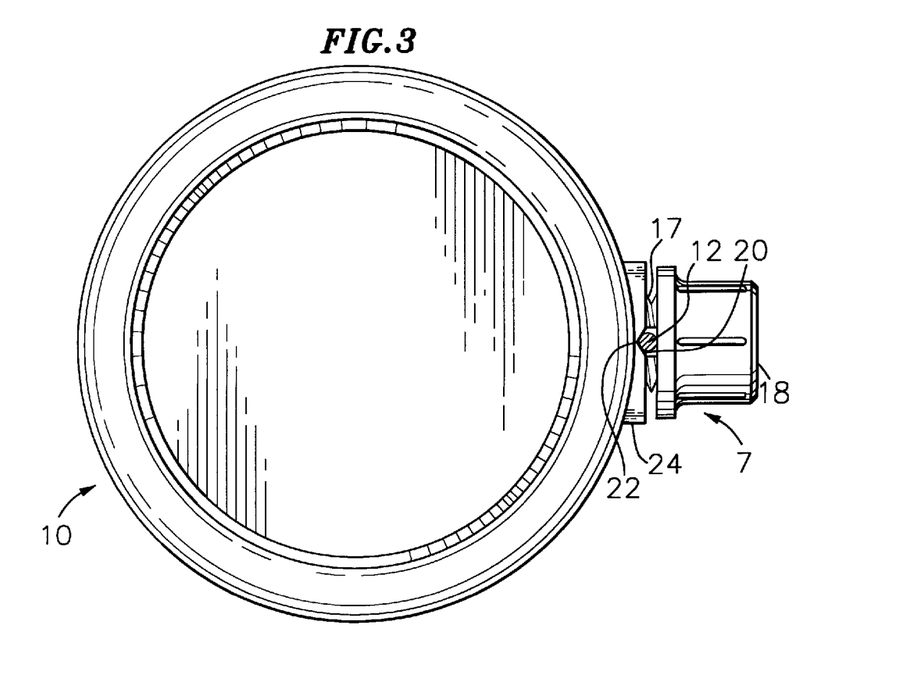
FIG. 3 is a top plan view of the feeding bowl of FIG. 2 showing the vertical wire in the slot.

Attached to the side wall 5 is an attachment mechanism 7 comprising a male member 17 and female member 18. As shown in FIG. 1 the bowl is attached to vertical wire 12. As can be seen in FIGS. 2 and 3, wire 12 extends through a slot 20 in the male member. The mounting mechanism shown in FIGS. 2 and 3 is shown in its secured position. The female member has a flange 13 circumscribing a threaded aperture 15 and is screw threaded and tightened onto the male member so that the wire is secured against the base of slot 20 in the male member and against the face of the flange of the abutting female member. The base 22 of slot 20 is V-shaped in cross-section to provide a secure seating position for wire 12. The male member is integrally molded into a base flange 24 which has a lateral dimension which is wider than the diameter of the male member to form a flange or shoulder and is secured to the side wall 5 of the dish. When the female member is screw threaded onto the male member and brought to bear against the wire 12, the facing flanges of the male member and the female member grasp and grip the wire holding the dish securely in place in cooperation with the slot in the male member.

Figure 5:
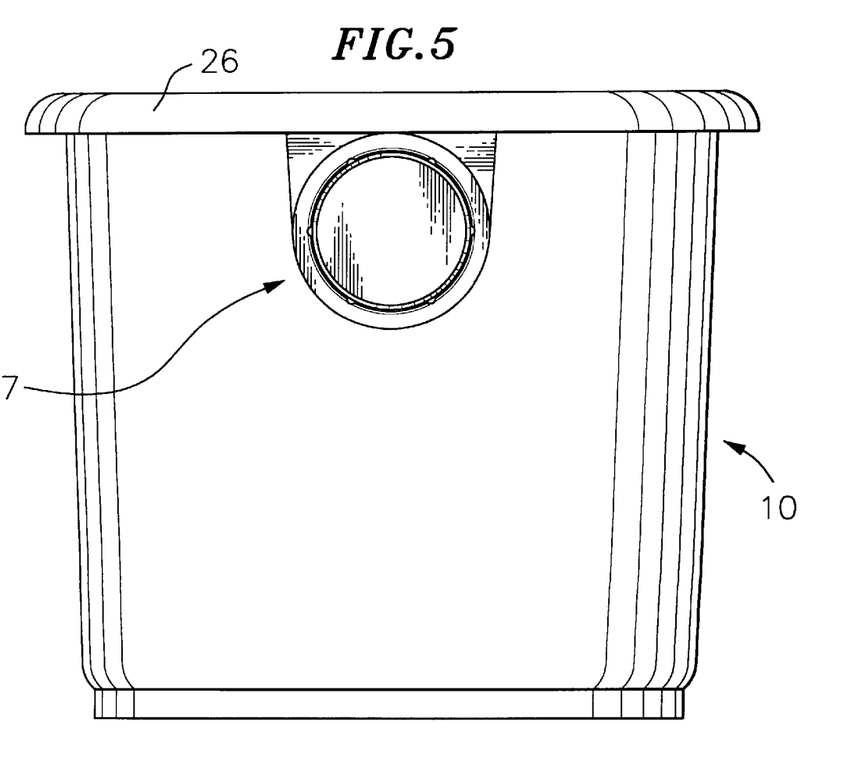
FIG. 5 is front elevation view of the feeding bowl with attachment mechanism.

An example of the bowl or dish according to the present invention before it is attached to the wires of an enclosure is shown in FIG. 5. As shown therein, FIG. 5 is a side elevation of the dish taken from the side on which the attaching mechanism is mounted. As shown therein, the bowl has a rounded upper lip 26 formed integrally at the top of sidewall 5 of bowl to provide a secure perch for animals such as birds and the like to stand on while feeding or taking water from the contents within the bowl.

Figure 6:
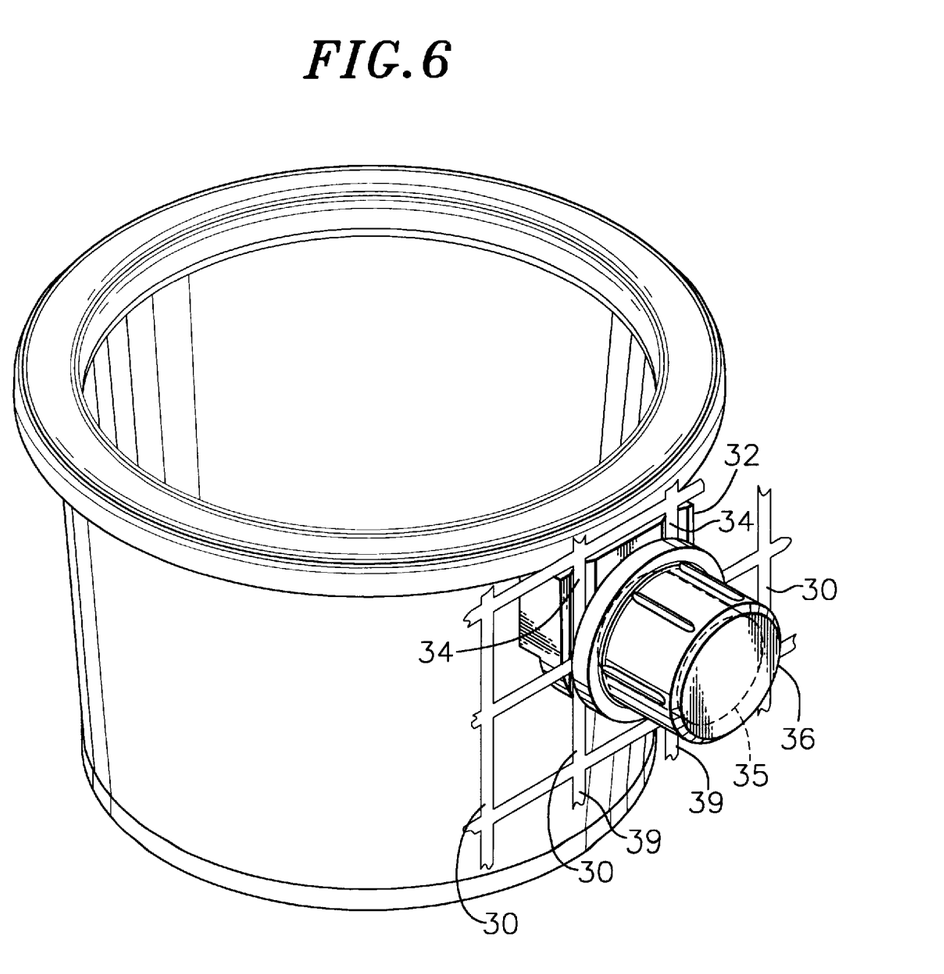
FIG. 6 is a perspective view of the feeding bowl according to the present invention showing an alternative mounting arrangement with the male member extending between adjacent wires of the animal enclosure.

An alternate embodiment of the invention is shown in FIG. 6 in perspective view with a male member 35 extending between two adjacent vertical wires 39 of an enclosure. The vertical wires of the enclosure are shown at 30. The base flange 32 of the male member 35 has a pair of v-shaped slots 34 formed at each side of member 35 to receive the vertical wires of the enclosure. As in embodiment shown in FIG. 1, a female member 36 is screw threaded onto male member 35 and tightened down against the wires to securely hold the bowl in position.

The diameter of the male member and the female member as well as the size of the bowl are a matter of choice depending upon the size of the animal for which the bowl is intended. The size of the bowl is scaled down for use in bird cages and with small animals and is proportionately increased in scale for use in feeding larger birds or animals. Likewise, the diameter of the male member can be increased or decreased depending on the spacing between the vertical or horizontal wires forming the enclosure.

Figure 4:
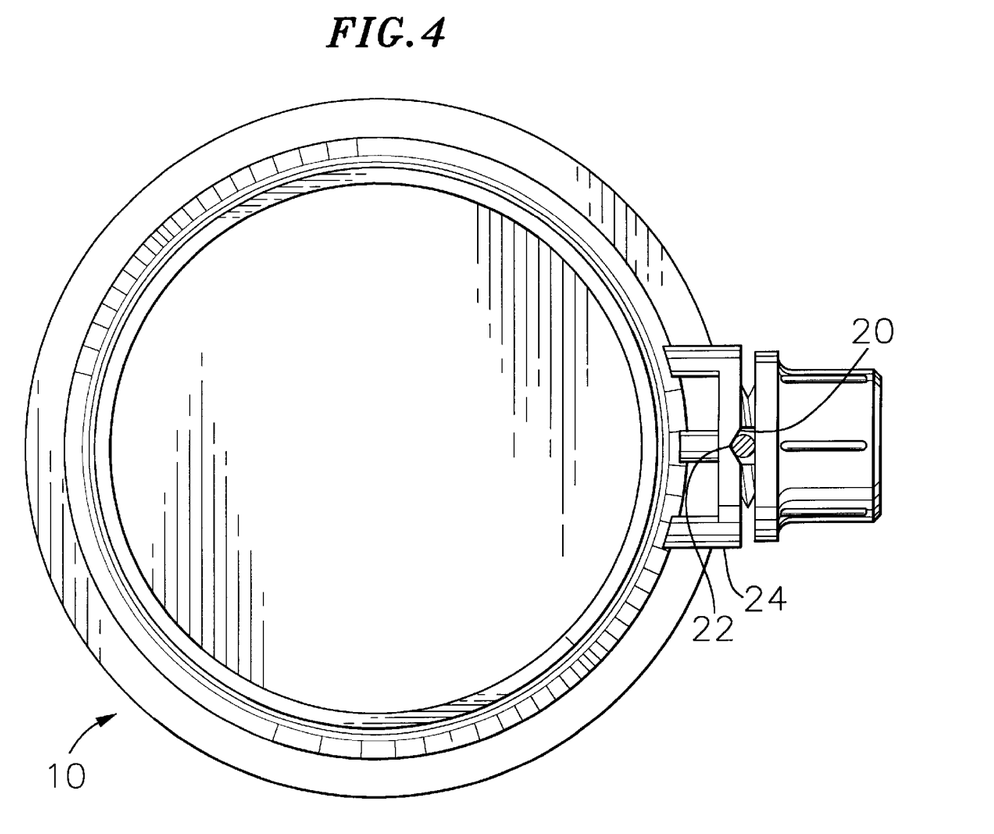
FIG. 4 is a bottom plan view of the feeding bowl and attachment mechanism.

As shown in FIGS. 3 and 4, the slot in the male member is shaped so as to define a V at the bottom of the slot. This provides a guide for seating the wire of an enclosure in the base of the slot to further secure and hold the feeding bowl in position. This V-shaped configuration of the slots applies to the various embodiments of the feeding bowl including the variation which the wire is located in a center slot of the male member as well as the embodiment where the slots are located in the base flange of the male member on either side of the threaded male member.

Figure 7A:
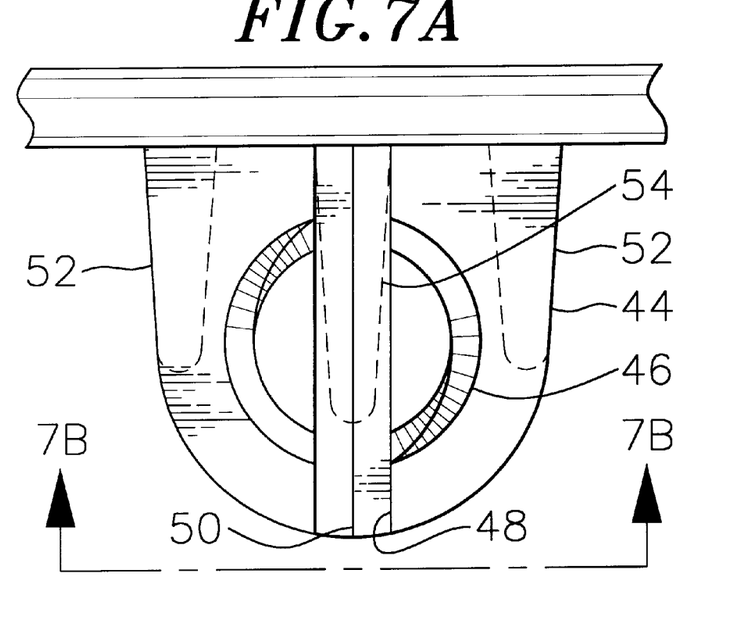
FIG. 7A is enlarged front elevation view of the attachment mechanism according to the present invention.
Figure 7B:
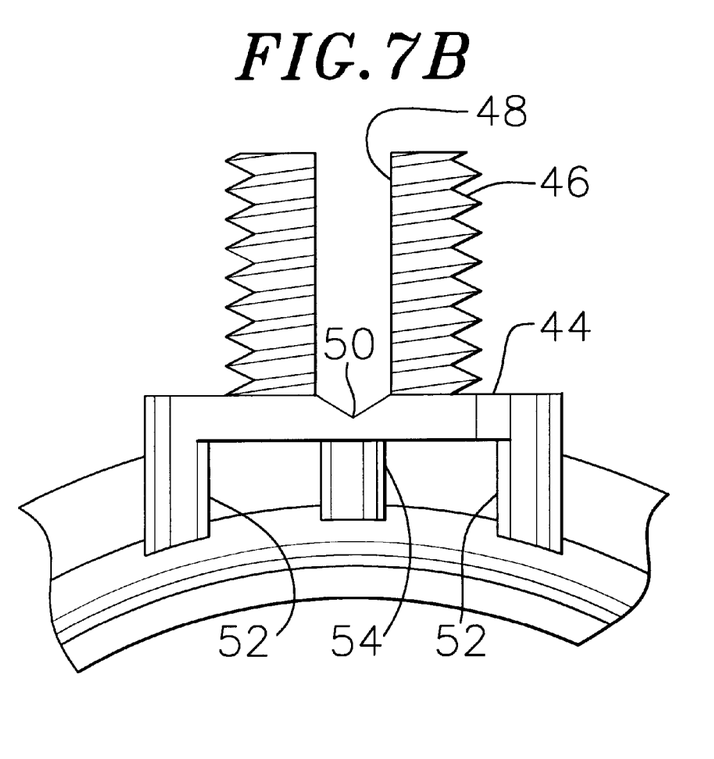
FIG. 7B is a bottom view of the attachment mechanism taken along lines 7B—7B of FIG. 7A.

A further detailed illustration of the mounting mechanism of the present invention is shown is FIGS. 7A and 7B. In particular, shown in these figures is a presently preferred embodiment of a male mounting member according to the present invention as is shown in FIG. 7A, the male member comprises base flange 44 with a male member 46 projecting therefrom. The male member has a vertical slot 48 extending through the center of the male member 46. In other embodiments, a horizontal slot or slots are also suitable. The base of the slot is V-shaped as shown in FIG. 7B and as indicated by the center line 50 bisecting the slot. Base flange 44 is supported by two vertical side ribs 52 located at each side of flange 44 and extending between the underside of flange 44 and the side wall of the feeding bowl. A center rib 54 extends vertically beneath the center of flange 44 between the center flange and the sidewall of the bowl to a length which is slightly greater than the length of side ribs 52. Center rib 54 provides a base of support for the mounting mechanism and structurally reinforces the mounting slot 48 so that when the female member is tightened upon the male member and the wire of an enclosure is caused to bear against the bottom 50 of slot 48, rib 52 supports and reinforces the structure so as to obtain a secure mounting and prevent cracking or crazing of flange 44 under pressure from the closure and tightening of the female member upon the wire.

Figure 8:
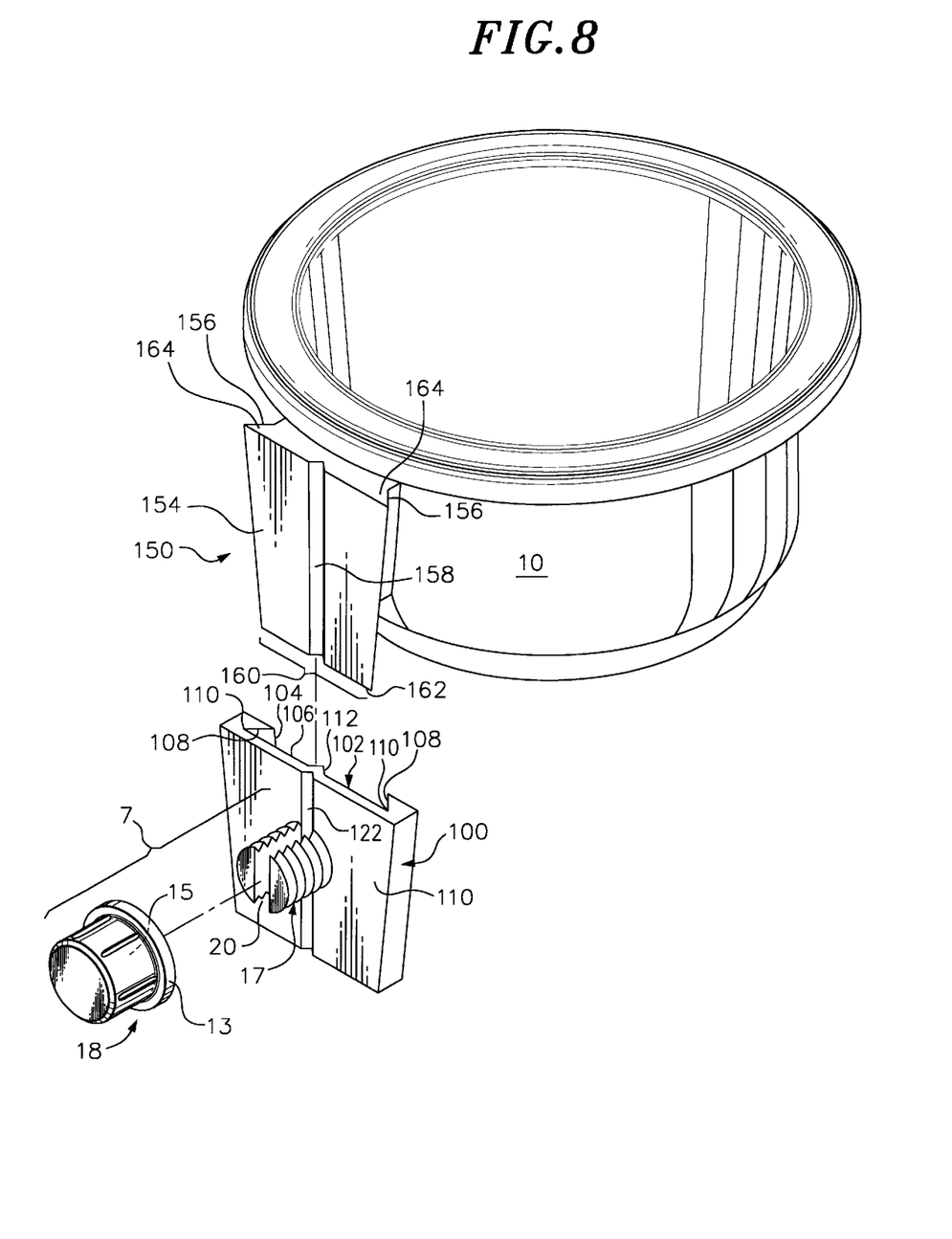
FIG. 8 is an exploded view of an animal feeding bowl of the present invention having a bracket for attaching to a cage and having a male connection member extending from the bowl for releasably attaching to the bracket.

In an alternate embodiment, shown in FIG. 8, the attachment mechanism 7 including the male 17 and female 18 members is detachable from the bowl. With this embodiment, the bowl can be removed from the cage without unscrewing the female member. As can be seen from FIG. 8, the male member is formed on a bracket 100. The bracket forms an inner channel like opening 102. In a preferred embodiment, opening 102 has a dove tail shape in cross-section such that the opening is narrower at its mouth 104 than at its base 106. The opening is defined by a base surface 106 and two edge surfaces 108. Each edge surface extends from a side edge 110 of the base surface. The opening is tapered along its length. Thus, the width of the opening base decreases from an upper end of the bracket toward a lower end of the bracket. A beveled groove 122 is formed longitudinally along the outer surface 110 of the bracket 100. The slotted male member 17 extends from about the center of the outer surface 110 of the bracket such the that groove 122 forms the base of the male member slot 20. The rear surface 110 in essence defines a flange.

Preferably, a linear longitudinal protrusion 112 is formed on the inner surface of the channel opposite the groove. Preferably the linear protrusion is V-shaped in cross-section.

A male connection member 150 is attached or is integral to the side wall of the dish 10. Preferably, the male connection member has outer surfaces which register with to the inner surfaces of the bracket defining the bracket opening. As such, in the preferred embodiment, the male connection member forms a dove tail in cross-section and tapers from a wider to a narrower cross-section in a direction toward the bottom of the bowl. The male connection member has primary surface 154 that is complementary to the bracket opening base surface 106. The male connection member also has an edge surface 156 extending from each side edge of the primary surface. The edge surfaces 156 of the male connection member correspond to and are complementary to the opening edge surfaces 108. A groove 158 complementary to the protrusion 112 is formed on the primary surface of the male member. In a preferred embodiment, the groove 158 has a "V" shape in cross-section.

The bracket is connected to a cage wire or lattice using its attachment mechanism male 17 and female 18 member as earlier described. A cage wire is directed through the slot 20 formed on the attachment mechanism male member until it is seated in the groove 122 at the base of the slot 20 formed on the outer surface of the attachment bracket. The female member is then threaded onto the male member until its flange 13 circumscribing its threaded aperture 15 engages the wire and compresses it against the surfaces of the groove 122. Alternatively the bracket may be attached to a cage by sandwiching cage lattice members between the female member flange 13 and the outer surface 110 of the bracket.

Once the attachment bracket is secured in place, the bowl is coupled to the bracket by sliding the bowl's male connection member into the bracket opening. This is accomplished by introducing and sliding the lowest narrow end of the male connection member into the upper wide end of the bracket opening 102. When the male connection member is introduced to the bracket opening, the protrusion 112 formed on the inner surface of the bracket opening base is aligned with the groove 158 formed on the primary surface of the male connection member. The groove guides the male connection member downward into the bracket opening. The male connection member slides downward into the tapered opening to a level where the width of the opening is less than the width 160 of the lower end 162 male connection member. When that occurs, preferably the primary 154 and edge surfaces 156 of the male connection member are mated against their corresponding surfaces on the bracket opening. As the bowl and connection member are slid further downward, the male connection member further sits into the bracket opening securing the bowl to the bracket. To remove the bowl, the bowl with the male connection member is slid upward. As can be seen, the longitudinal protrusion 112 serves to guide the male connection member 150 as well as stiffen the bracket 100.

Use of an attachment bracket that forms a dove tail in cross-section and a male connection member that is complementary to the bracket opening, allows each edge portion 164 of the male connection member to be sandwiched between the base 106 of the opening and a corresponding opening edge surface 108 of the bracket. Consequently, when the male connection member is seated into the opening, it is also restrained from moving in any direction other than upward.

In an alternate embodiment not shown, the bracket does not have a protrusion 112 and the male connection member does not have a corresponding groove 158. Moreover, the bracket opening may have cross-sectional shape other than a dove tail. Similarly, the male connection member may have a cross-sectional shape other than a dove tail.

With any of the above embodiments a two or multiple sectioned feeding bowl, i.e., a feeding bowl with two or more compartments may be used. A preferred multiple sectioned feeding bowl 168 consists of a base 170, a rear wall 172, side walls 174 and a front wall 176. (FIG. 9A) The front wall is shorter in elevation than the rear wall. Partitions 178 divide the bowl in different sections. Each partition has the same elevation as the rear wall. The side walls also have the same elevation as the rear wall. The bowl is typically made of a hardened plastic material.

Figure 9A:
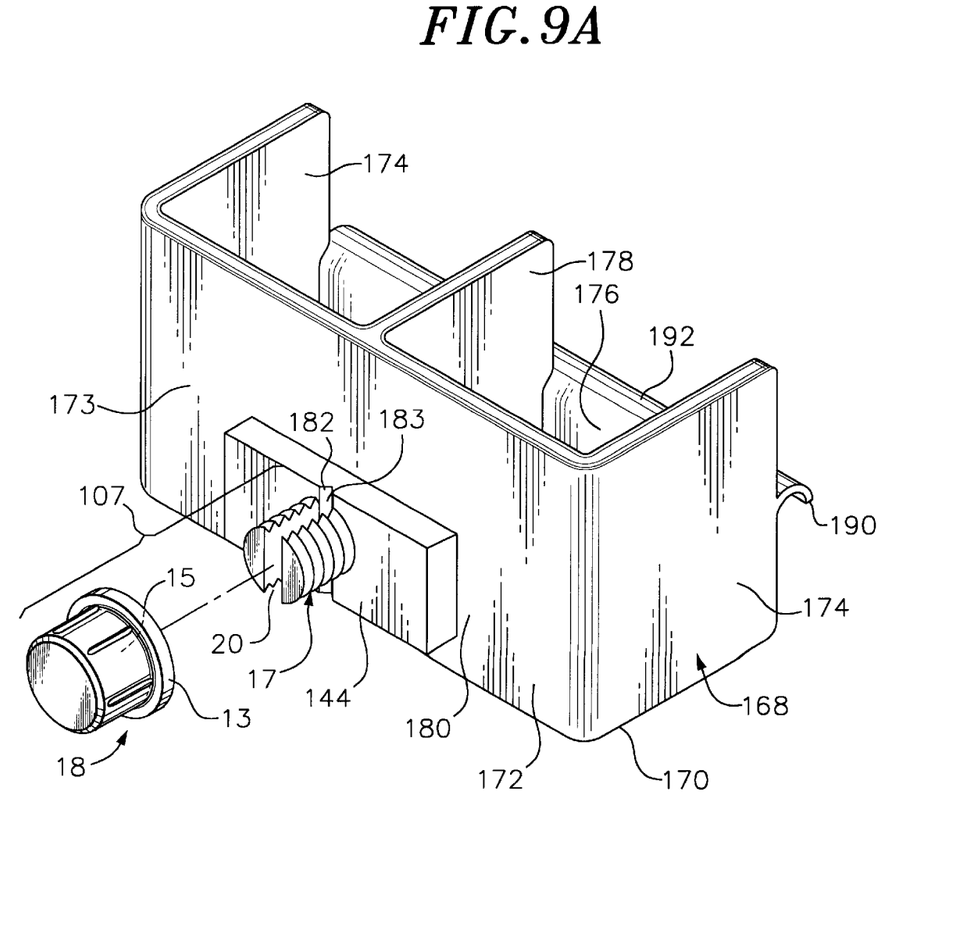
FIG. 9A is a perspective view of an animal feeding bowl of the present invention having two separate compartments, as well as a base flange extending from the rear surface of the bowl rear wall from which extends a male member.
Figure 9B:
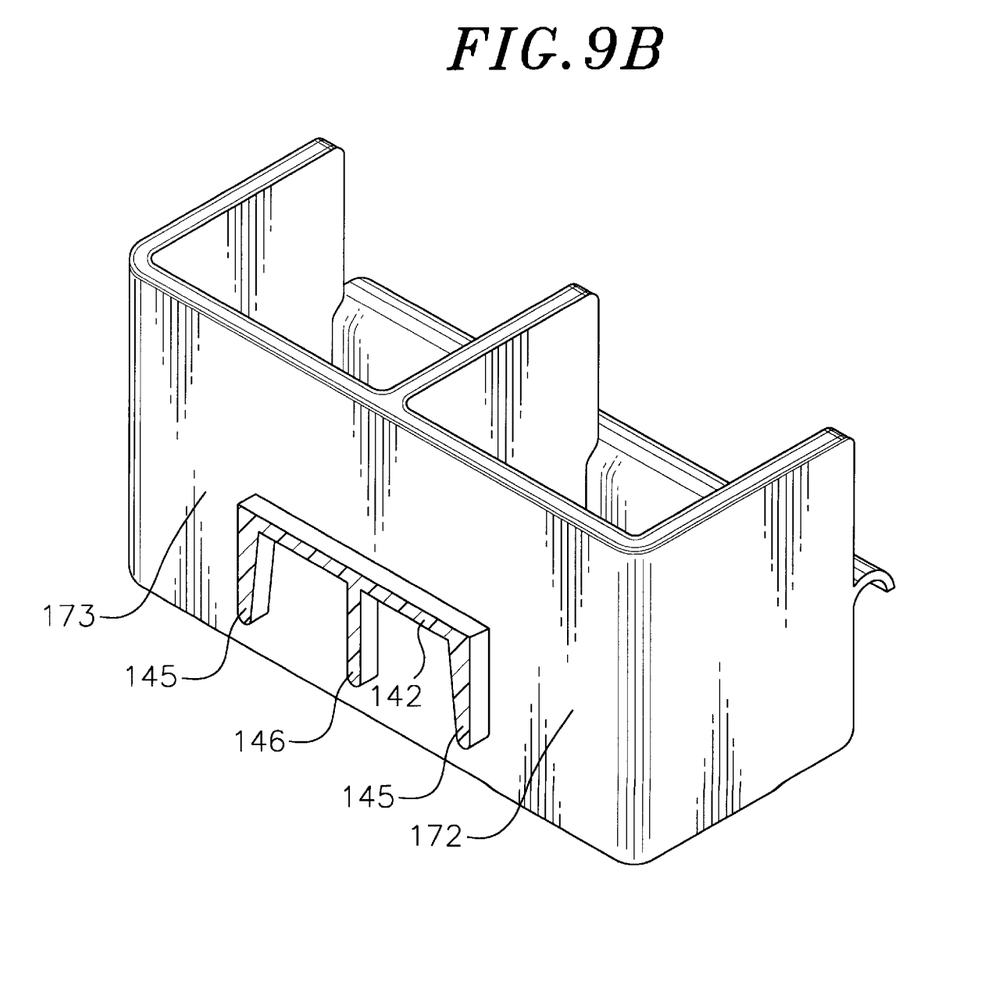
FIG. 9B is a perspective view of the feeding bowl shown in FIG. 9A depicting a cut-away view of the base flange showing the stiffening ribs used to reinforce the base flange.

An attachment assembly 107 extends from the rear surface 173 of the rear wall 172. As described above, the attachment assembly consists of a base flange 144 extending from the surface 173 of the rear wall 172 from which extends of a slotted male member 17. The base 182 of the slot 20 in the male member 17 is beveled forming a groove 183. The attachment assembly also includes a female member 18 as described above that threads to the male member. The female member 18 also has a flange 13 which circumscribes the female member's threaded aperture 15. The base flange 144 is supported by two vertical side ribs 145 located at each side of the flange 144 and extending between the underside of the flange 144 and the rear surface 173 of the rear wall 172. (FIG. 9B) A center rib 146 extends vertically beneath the center of the flange 144 and the rear surface 173 of the rear wall 172. The center rib 146 provides support for the base flange 144 and reinforces the beveled base 182 of the slot 20 so that when the female member 20 is tightened on the male member and the wire of the cage is caused to bear against the bottom of the groove 183 of slot 20, the center rib 146 supports and reinforces the structure 50 so as to obtain a secure mounting while preventing cracking or crazing of the flange 144 under the pressure from the closure and tightening of the female member upon the wire. A further transverse rib 142 spanning across the upper ends of the center and side ribs providing support and reinforcement to the base flange 144.

When the bowl is mounted on a cage, the animals or birds feed from the front of the bowl over the upper end of the front wall 136. The edge 190 of the front wall is curved outward forming a rounded, and preferably a cylindrical surface 192. In this regard, the upper edge of the front wall which may be relatively sharp is hidden from the feeding side of the dish so as to prevent injuring the birds or animals during feeding. The rounded or cylindrical surface also forms a perch for birds to sit on while feeding.

Different types of food or water may be used to fill each section of the bowl. For example, seeds may be placed in a first section while water may be placed in the second section. The food or water level is limited by the height of the front wall. As the bird or animal feeds over the front wall the taller partition, side, and rear walls prevent the food from spilling from one section of the bowl to the next, or from spilling from the rear or sides of the bowl.

To prevent, food or liquid spillage from a rear end of or bowl, a guard 200 may be used. (FIG. 10) The guard is typically a flat piece of a plastic material and has an opening 202 that is larger in diameter than the diameter of the attachment male member 17 but smaller in diameter than the female member flange 13. After the cage wire 204 is fitted through the slot of the male member 17 (or after the male member penetrates the cage wire lattice between vertical and/or horizontal wire members), the guard is fitted over the male member sandwiching the wire (or wires) between the slot base 50 (or the base flange 44) and the guard. The female member 18 is then threaded to the male member sandwiching the guard between the wire (or wires) and the female member flange 13. Preferably, the guard also extends below the base 214 of the bowl.

Figure 10:
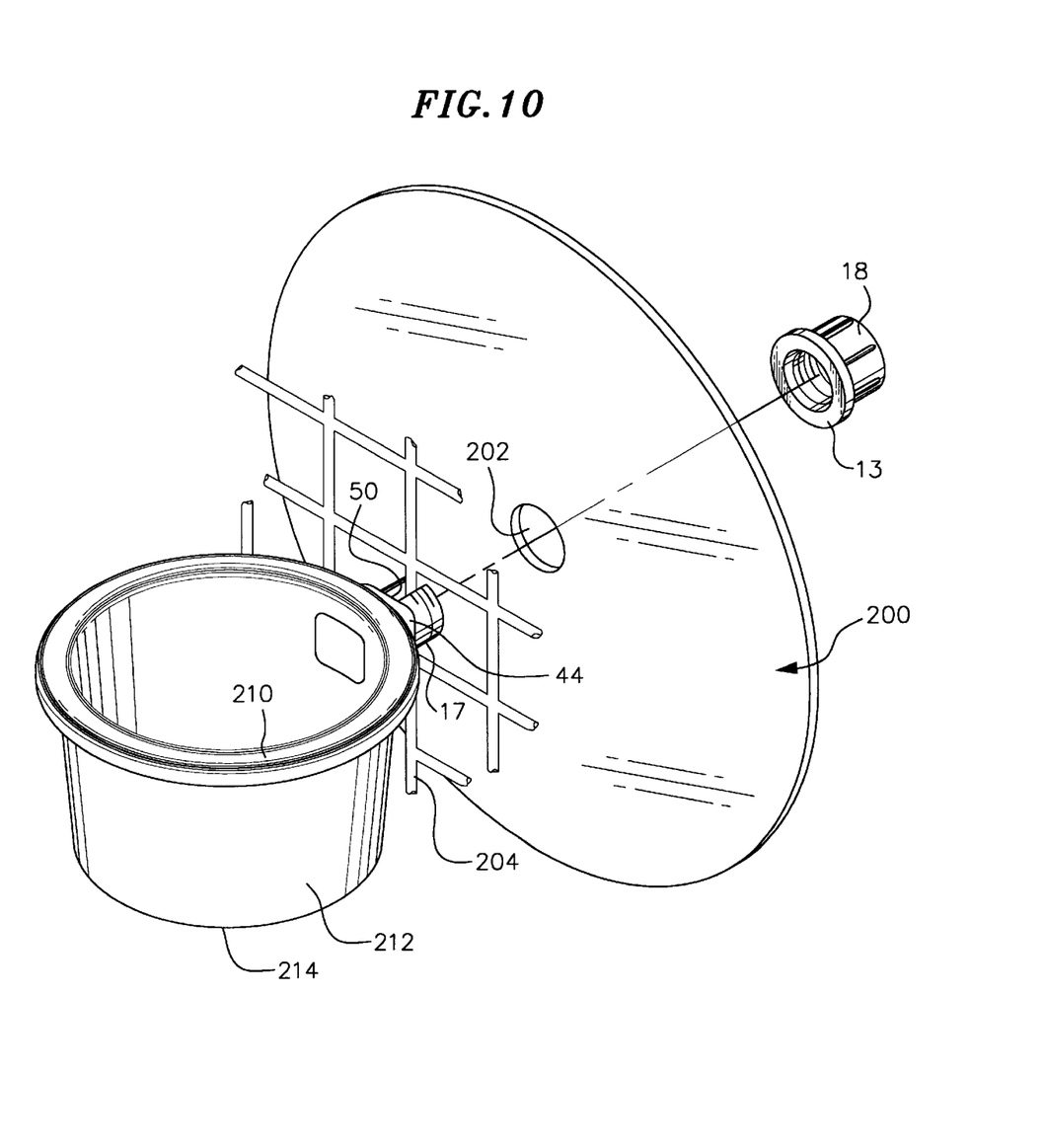
FIG. 10 is an exploded view showing the assembly of a feeding bowl and guard to a cage.

The guard can have any geometrical shape and should preferably be clear so as to not obstruct the view through the cage. The guard should also be large enough so as to extend beyond the upper 210 and side 212 surfaces of the dish or bowl. Preferably, the guard also extends below base 214 of the bowl.

What is claimed is:

1. A mounting assembly removably securing an object to a lattice having a plurality of elements comprising:
   a bracket comprising,
      a base portion for connecting to the lattice, the base position having side edges and a rear surface,
      a side portion extending from each edge of the base portion,
      a front channel opening defined between the side and base portions, having a width that narrows from an upper end toward a lower end of the bracket;
      a protrusion formed longitudinally along an inner surface of the base portion; and
   a male connection member connected to the object, the male connection/member comprising,
      an upper end and a lower end wherein the width of the member narrows in a direction toward the lower member lower end, wherein the male member is slidingly fitted within the opening, and wherein the base and side portions of the bracket engage and support the male connection member, and
      a groove formed on a surface of the male connection member, wherein the groove is complementary to the protrusion and wherein when the male member is slidingly fitted within the bracket opening the protrusion slidingly engages the groove.

2. A mounting assembly as recited in claim 1 wherein the male connection member outer surfaces are complementary to the bracket opening inner surfaces.

3. A mounting assembly as recited in claim 2 wherein the opening formed on the bracket has a dove tail shape in cross-section and wherein the male connection member has a dove tail shape in cross-section.

4. A mounting assembly as recited in claim 1 wherein at least a portion of the male connection member is sandwiched between the base portion and a side portion of the bracket.

5. A mounting assembly as recited in claim 1 wherein the groove is beveled.

6. A mounting assembly removably securing an object to a lattice having a plurality of elements comprising:
   a bracket comprising,
      a base portion for connecting to the lattice, the base portion having side edges and a rear surface,
      a side portion extending from each edge of the base portion,
      a front channel opening defined between the side and base portions, having a width that narrows from an upper end toward a lower end of the bracket;
   a male connection member connected to the object, the male connection member comprising an upper end and a lower end wherein the width of the member narrows in a direction toward the lower end, wherein the male member is slidingly fitted within the opening, and wherein the base and side portions of the bracket engage and support the male connection member;
   a bracket male member connected at a fixed end to the rear surface of the bracket and having a threaded portion at the opposite end, wherein said rear surface defines a first flange,
   said bracket male member defining a slot extending through the threaded portion for receiving and engaging one of said elements wherein at least a portion of the slot is beveled;
   means for reinforcing the structural integrity of said first flange; and
   a female member for threadedly engaging the threaded portion of the bracket male member, said female member defining a second flange opposed to the first flange,
   said bracket male and female members being connectable such that the first flange and the second flange can engage and grip at least one of the elements on opposite sides thereof as said element is seated in the base of the slot to hold the bracket in position.

7. A mounting assembly as recited in claim 6 wherein a portion of the slot is V-shaped.

8. A mounting assembly as recited in claim 6 wherein the object is a feeding dish for use in an animal cage.

9. A mounting assembly as recited in claim 8 further comprising a blocking surface having a hole, wherein the blocking surface is sandwiched between the first and second flanges and wherein the male member penetrates the hole.

10. A mounting assembly as recited in claim 9 wherein the blocking surface is transparent.

11. A mounting assembly removably securing an object to a lattice having a plurality of elements comprising:
    a bracket comprising,
       a base portion for connecting to the lattice, the base portion having side edges and a rear surface,
       a side portion extending from each edge of the base portion,
       a front channel opening defined between the side and base portions, having a width that narrows from an upper end toward a lower end of the bracket;
    a male connection member connected to the object, the male connection member comprising an upper end and a lower end wherein the width of the member narrows in a direction toward the lower end, wherein the male member is slidingly fitted within the opening, and wherein the base and side portions of the bracket engage and support the male connection member;
    a male member connected at one end to the rear surface of the bracket and having a threaded portion at the opposite end, wherein said rear surface defines a first flange,
    said male member having a diametrical dimension smaller than the spacing between two adjacent elements, and
    a female member for threadedly engaging the threaded portion of the male member, said female member defining a second flange opposed to the first flange,
    said male and female members being connectable with the threaded portion extending between two adjacent vertical or horizontal elements such that the first flange and the second flange can engage and grip the two adjacent elements on opposite sides thereof.

12. A mounting assembly as recited in claim 11 wherein the object is a feeding dish for use in an animal cage.

13. A mounting assembly as recited in claim 11 further comprising a blocking surface having a hole, wherein the blocking surface is sandwiched between the first and second flanges and wherein the male member penetrates said hole.

14. A mounting assembly as recited in claim 13 wherein the blocking surface is transparent.

15. A mounting assembly removably securing an object to a lattice having a plurality of elements comprising:
   first section extending from the object;
   a second section comprising,
      a male member connected at a fixed end to the second section and having a threaded portion at the opposite end, wherein the second section defines a first flange, said male member defining a slot extending through the threaded portion for receiving and engaging one of said elements wherein at least a portion of the slot is beveled,
      a female member for threadedly engaging the threaded portion of the male member, said female member defining a second flange opposed of the first flange,
      said male and female members being connectable such at the first flange and the second flange can engage and grip at least one of the elements on opposed sides thereof as said element is seated in the base of the slot to hold the second section in position,
      wherein the first section interlockingly engages the second section for securing the object onto the second section.

16. A mounting assembly removably securing an object to a lattice having a plurality of elements comprising:
   a first section extended from the object;
   and a second section comprising,
      a male member connected at one end to the second section having a threaded portion at the opposite end, wherein the second end defines the first flange,
      said male member having a diametrical dimension smaller than the spacing between two adjacent elements,
      a female member for threadedly engaging the threaded portion of the male member said female member defining a second flange opposed to the first flange,
      said male and female members connectable with the threaded portion extended between two adjacent elements such that the first flange and the second flange can engage and grip the two adjacent elements on opposite sides thereof; for securing the second section to the lattice,
      wherein the first section removeably engages the second section, for securing the object onto the second section.

17. A mounting assembly for securing a dish to a cage lattice having wire elements comprising:
   a dish having a maximum height and a maximum width;
   a male member connected at a fixed end to the rear surface of the dish and having a threaded portion at the opposite end,
   said male member defining a first flange at the fixed end of the threaded portion;
   a blocking surface having a hole, the hole being penetrated by the male member, the blocking surface having a height greater than the maximum height of the dish and having a width greater than the maximum width of the dish; and
   a female member for threadedly engaging the threaded portion of the male member, said female member defining a second flange opposed to the male member flange,
   said male and female members being connectable such that the blocking member and at least one of the elements is sandwiched between flange of said male member and the flange of said female member.

18. A mounting assembly as recited in claim 17 wherein the blocking surface is planar.

19. A mounting assembly as recited in claim 18 wherein the blocking surface is circular and wherein the hole is formed on the center of the blocking surface.

20. A mounting assembly as recited in claim 17 wherein the blocking surface is transparent.

21. A mounting assembly as recited in claim 17 wherein the blocking surface has a lateral dimension greater than the lateral dimension of the dish.

22. A mounting assembly as recited in claim 17 wherein the blocking surface has a height greater than the height of the dish.

23. A mounting assembly as recited in claim 17 wherein said male member defines a slot extending through the threaded portion for receiving and engaging one of said elements.

24. A mounting assembly as recited in claim 23 wherein the base of said slot is beveled.

25. An animal feeding bowl comprising:
   a rear wall having a predetermined elevation;
   a base wall;
   two side walls having an elevation about equal to the elevation of the rear wall;
   a front wall having an upper edge and an elevation shorter than the rear wall, wherein the upper edge of the front wall is curved out of the plane of the wall forming a curved surface;
   at least one partition wall having an elevation about equal to the elevation of the rear wall;
   a male member connected at a fixed and to the rear surface of the bowl between the two side walls and having a threaded portion at the opposite end, said male member defining a first flange at the fixed end of the threaded portion, wherein said male member is entirely located between the two side walls; and
   female member for threadedly engaging the threaded portion of the male member, said female member defining a second flange opposed to the male member flange, said male and female members being connectable for sandwiching a cage lattice element between the flange of said male member and the flange of said female member.

26. An animal feeding bowl comprising:
   a rear wall having a predetermined elevation;
   a base wall;
   two side walls having an elevation about equal to the elevation of the rear wall;
   a front wall having an upper edge and an elevation shorter than the rear wall;
   at least one partition wall having an elevation about equal to the elevation of the rear wall;
   a male member connected at a fixed end to the rear surface of the bowl and having a threaded portion at the opposite end, said male member defining a first flange at the fixed end of the threaded portion wherein said male member defines a slot through the threaded portion for receiving and engaging a cage lattice element; and
   a female member for threadedly engaging the threaded portion of the male member, said female member defining a second flange opposed to the male member flange, said male and female members being connectable for sandwiching a cage lattice element between the flange of said male member and the flange of said female member.

27. A bowl as recited in claim 26 wherein the base of said slot is beveled.

* * * * *

UNITED STATES PATENT AND TRADEMARK OFFICE
CERTIFICATE OF CORRECTION

PATENT NO. : 6,189,489 B1
DATED : February 20, 2001
INVENTOR(S) : Woodrow W. Pearce Page 1 of 1

It is certified that error appears in the above-identified patent and that said Letters Patent is hereby corrected as shown below:

Column 7,
Line 14, replace "position" with -- portion --.

Column 9,
Line 3, before "first section" insert -- a --.
Line 14, after "opposed" delete -- of --.
Line 16, replace "at" with -- that --.
Line 40, replace "thereof;" with -- thereof --.
Line 57, after "dish;" delete "and".
Line 61, replace "flange," with -- flange; and --.
Line 64, after "between" insert -- the --.

Column 10,
Line 26, replace "fixed and" with -- fixed end --.
Line 32, before "female member" insert -- a --.

Signed and Sealed this

Twenty-third Day of April, 2002

Attest:

Attesting Officer

JAMES E. ROGAN
Director of the United States Patent and Trademark Office